(12) United States Patent
Lawrence

(10) Patent No.: US 8,209,246 B2
(45) Date of Patent: Jun. 26, 2012

(54) PROPRIETARY RISK MANAGEMENT CLEARINGHOUSE

(75) Inventor: David Lawrence, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 1940 days.

(21) Appl. No.: 10/464,601

(22) Filed: Jun. 18, 2003

(65) Prior Publication Data

US 2004/0024693 A1 Feb. 5, 2004

Related U.S. Application Data

(63) Continuation-in-part of application No. 10/074,584, filed on Feb. 12, 2002, now abandoned, and a continuation-in-part of application No. 10/021,124, filed on Oct. 30, 2001, now abandoned, which is a continuation-in-part of application No. 09/812,627, filed on Mar. 20, 2001.

(60) Provisional application No. 60/390,459, filed on Jun. 20, 2002.

(51) Int. Cl.
*G06Q 40/00* (2006.01)
(52) U.S. Cl. ......... 705/35; 705/36 R; 705/36 T; 705/37; 705/38; 705/39; 235/440
(58) Field of Classification Search ............... 705/35–39; 235/440
See application file for complete search history.

(56) References Cited

U.S. PATENT DOCUMENTS

| | | | |
|---|---|---|---|
| 4,326,259 A | 4/1982 | Cooper et al. | |
| 4,346,442 A | 8/1982 | Musmanno | |
| 4,376,978 A | 3/1983 | Musmanno | |
| 4,386,233 A | 5/1983 | Smid et al. | |
| 4,597,046 A | 6/1986 | Musmanno et al. | |
| 4,718,009 A | 1/1988 | Cuervo | |
| 4,727,243 A | 2/1988 | Savar | |
| 4,734,564 A | 3/1988 | Boston et al. | |
| 4,736,294 A | 4/1988 | Gill et al. | |
| 4,774,663 A | 9/1988 | Musmanno et al. | |
| 4,774,664 A | 9/1988 | Campbell et al. | |
| 4,799,156 A | 1/1989 | Shavit et al. | 705/26 |

(Continued)

FOREIGN PATENT DOCUMENTS

CA 2441211 9/2003

(Continued)

OTHER PUBLICATIONS

Int'l Search Report from PCT/US03/19198 dated Dec. 23, 2003.

(Continued)

*Primary Examiner* — Narayanswamy Subramanian
(74) *Attorney, Agent, or Firm* — Perkins Coie LLP

(57) ABSTRACT

A computerized risk management method and system for facilitating analysis and quantification of risk associated with a risk subject on a proprietary basis. A proprietary risk management system combines gathered information with information received from a source such as an automated risk management clearinghouse system and maintains a database to relate risk variables and calculate a measurement of risk. The measurement, which can be a risk quotient or other rating based upon a weighted algorithm applied to the risk variables, is indicative of risk associated with the risk subject. Actions commensurate with a risk quotient can be presented to a user to facilitate management of risk associated with a particular entity or transaction or other transaction. A stored history can be created to mitigate adverse effects relating to a problematic transaction.

16 Claims, 6 Drawing Sheets

U.S. PATENT DOCUMENTS

| | | | | |
|---|---|---|---|---|
| 4,812,628 | A | 3/1989 | Boston et al. | |
| 4,868,866 | A | 9/1989 | Williams, Jr. | |
| 4,914,587 | A | 4/1990 | Clouse | |
| 4,953,085 | A | 8/1990 | Atkins | |
| 4,989,141 | A | 1/1991 | Lyons et al. | |
| 5,025,138 | A | 6/1991 | Cuervo | |
| 5,038,284 | A | 8/1991 | Kramer | |
| 5,068,888 | A | 11/1991 | Scherk et al. | |
| 5,161,103 | A | 11/1992 | Kosaka et al. | |
| 5,177,342 | A | 1/1993 | Adams | |
| 5,210,687 | A * | 5/1993 | Wolfberg et al. | 705/36 R |
| 5,239,462 | A | 8/1993 | Jones et al. | |
| 5,274,547 | A | 12/1993 | Zoffel et al. | |
| 5,323,315 | A * | 6/1994 | Highbloom | 705/38 |
| 5,347,632 | A | 9/1994 | Filepp et al. | |
| 5,398,300 | A | 3/1995 | Levey | |
| 5,432,542 | A | 7/1995 | Thibadeau et al. | |
| 5,444,819 | A | 8/1995 | Negishi | |
| 5,446,885 | A | 8/1995 | Moore et al. | |
| 5,448,047 | A | 9/1995 | Nair et al. | |
| 5,453,601 | A | 9/1995 | Rosen | |
| 5,455,407 | A | 10/1995 | Rosen | |
| 5,457,305 | A | 10/1995 | Akel et al. | |
| 5,557,518 | A | 9/1996 | Rosen | |
| 5,565,909 | A | 10/1996 | Thibadeau et al. | |
| 5,627,886 | A | 5/1997 | Bowman | |
| 5,648,900 | A | 7/1997 | Bowen et al. | |
| 5,649,116 | A | 7/1997 | McCoy et al. | |
| 5,671,279 | A | 9/1997 | Elgamal | |
| 5,679,938 | A | 10/1997 | Templeton et al. | |
| 5,679,940 | A | 10/1997 | Templeton et al. | |
| 5,680,305 | A | 10/1997 | Apgar, IV | |
| 5,689,652 | A | 11/1997 | Lupien | |
| 5,696,907 | A | 12/1997 | Tom | |
| 5,704,045 | A | 12/1997 | King et al. | |
| 5,717,923 | A | 2/1998 | Dedrick | |
| 5,732,397 | A | 3/1998 | DeTore et al. | |
| 5,732,400 | A * | 3/1998 | Mandler et al. | 705/26 |
| 5,787,402 | A | 7/1998 | Potter et al. | |
| 5,790,639 | A | 8/1998 | Ranalli et al. | |
| 5,797,133 | A | 8/1998 | Jones et al. | |
| 5,799,087 | A | 8/1998 | Rosen | |
| 5,809,478 | A | 9/1998 | Greco et al. | |
| 5,819,226 | A | 10/1998 | Gopinathan et al. | |
| 5,819,236 | A | 10/1998 | Josephson | |
| 5,852,812 | A | 12/1998 | Reeder | |
| 5,875,431 | A | 2/1999 | Heckman et al. | |
| 5,878,400 | A | 3/1999 | Carter, III | |
| 5,884,289 | A | 3/1999 | Anderson et al. | |
| 5,898,154 | A | 4/1999 | Rosen | |
| 5,903,882 | A | 5/1999 | Asay et al. | |
| 5,920,629 | A | 7/1999 | Rosen | |
| 5,930,762 | A | 7/1999 | Masch | |
| 5,933,816 | A | 8/1999 | Zeanah et al. | |
| 5,940,812 | A | 8/1999 | Tengel et al. | |
| 5,940,843 | A | 8/1999 | Zucknovich et al. | |
| 5,953,423 | A | 9/1999 | Rosen | |
| 5,963,648 | A | 10/1999 | Rosen | |
| 5,963,923 | A | 10/1999 | Garber | |
| 5,974,146 | A | 10/1999 | Randle et al. | |
| 5,991,743 | A * | 11/1999 | Irving et al. | 705/36 R |
| 6,003,013 | A | 12/1999 | Boushy et al. | |
| 6,014,228 | A | 1/2000 | Castro | |
| 6,016,963 | A | 1/2000 | Ezawa et al. | |
| 6,018,715 | A | 1/2000 | Lynch et al. | |
| 6,018,723 | A * | 1/2000 | Siegel et al. | 705/38 |
| 6,021,397 | A | 2/2000 | Jones et al. | |
| 6,047,887 | A | 4/2000 | Rosen | |
| 6,078,904 | A | 6/2000 | Rebane | |
| 6,078,905 | A | 6/2000 | Pich-LeWinter | |
| 6,085,175 | A | 7/2000 | Gugel et al. | |
| 6,088,686 | A | 7/2000 | Walker et al. | |
| 6,105,007 | A | 8/2000 | Norris | |
| 6,105,010 | A | 8/2000 | Musgrave | |
| 6,119,103 | A | 9/2000 | Basch et al. | 705/35 |
| 6,148,297 | A | 11/2000 | Swor et al. | |
| 6,148,301 | A | 11/2000 | Rosenthal | |
| 6,199,073 | B1 | 3/2001 | Peairs et al. | |
| 6,205,433 | B1 | 3/2001 | Boesch et al. | |
| 6,219,805 | B1 | 4/2001 | Jones et al. | |
| 6,236,972 | B1 | 5/2001 | Shkedy | |
| 6,246,996 | B1 | 6/2001 | Stein et al. | |
| 6,249,770 | B1 | 6/2001 | Erwin et al. | |
| 6,278,983 | B1 | 8/2001 | Ball | |
| 6,289,320 | B1 | 9/2001 | Drummond et al. | |
| 6,304,915 | B1 | 10/2001 | Nguyen et al. | |
| 6,304,973 | B1 | 10/2001 | Williams | |
| 6,311,272 | B1 | 10/2001 | Gressel | |
| 6,317,727 | B1 | 11/2001 | May | 705/37 |
| 6,321,212 | B1 | 11/2001 | Lange | |
| 6,330,546 | B1 | 12/2001 | Gopinathan et al. | |
| 6,341,267 | B1 | 1/2002 | Taub | |
| 6,347,307 | B1 | 2/2002 | Sandhu et al. | |
| 6,393,423 | B1 | 5/2002 | Goedken | |
| 6,415,271 | B1 | 7/2002 | Turk et al. | |
| 6,456,984 | B1 | 9/2002 | Demoff et al. | |
| 6,513,020 | B1 | 1/2003 | Weiss et al. | |
| 6,516,056 | B1 | 2/2003 | Justice et al. | |
| 6,542,905 | B1 | 4/2003 | Fogel et al. | |
| 6,542,993 | B1 | 4/2003 | Erfani | |
| 6,598,028 | B1 | 7/2003 | Sullivan et al. | |
| 6,609,114 | B1 | 8/2003 | Gressel et al. | |
| 6,609,658 | B1 | 8/2003 | Sehr | |
| 6,658,393 | B1 * | 12/2003 | Basch et al. | 705/38 |
| 6,658,400 | B2 | 12/2003 | Perell et al. | |
| 6,671,818 | B1 | 12/2003 | Mikurak | |
| 6,684,190 | B1 * | 1/2004 | Powers et al. | 705/36 R |
| 6,714,918 | B2 | 3/2004 | Hillmer et al. | |
| 6,738,760 | B1 | 5/2004 | Krachman | |
| 6,751,607 | B2 | 6/2004 | Kraay et al. | |
| 6,757,898 | B1 | 6/2004 | Ilsen et al. | |
| 6,785,661 | B1 * | 8/2004 | Mandler et al. | 705/39 |
| 6,829,590 | B1 * | 12/2004 | Greener et al. | 705/38 |
| 6,842,737 | B1 | 1/2005 | Stiles et al. | |
| 6,868,408 | B1 | 3/2005 | Rosen | |
| 6,898,574 | B1 | 5/2005 | Regan | |
| 6,910,628 | B1 | 6/2005 | Sehr | |
| 6,915,265 | B1 | 7/2005 | Johnson | |
| 6,915,271 | B1 | 7/2005 | Meyer et al. | |
| 6,947,908 | B1 | 9/2005 | Slater | |
| 6,965,831 | B2 | 11/2005 | Domany et al. | |
| 6,971,026 | B1 | 11/2005 | Fujiyama et al. | |
| 6,983,266 | B1 | 1/2006 | Goldschmidt | |
| 6,985,886 | B1 | 1/2006 | Broadbent et al. | |
| 7,003,661 | B2 | 2/2006 | Beattie et al. | |
| 7,006,992 | B1 * | 2/2006 | Packwood | 705/38 |
| 7,024,383 | B1 * | 4/2006 | Mancini et al. | 705/35 |
| 7,069,234 | B1 | 6/2006 | Cornelius et al. | |
| 7,089,208 | B1 | 8/2006 | Levchin et al. | |
| 7,114,177 | B2 | 9/2006 | Rosenberg et al. | |
| 7,120,929 | B2 | 10/2006 | Beattie et al. | |
| 7,124,101 | B1 | 10/2006 | Mikurak | |
| 7,133,846 | B1 | 11/2006 | Ginter et al. | |
| 7,161,465 | B2 | 1/2007 | Wood et al. | |
| 7,167,844 | B1 | 1/2007 | Leong et al. | |
| 7,181,428 | B2 | 2/2007 | Lawrence | |
| 7,209,889 | B1 | 4/2007 | Whitfield | |
| 7,231,327 | B1 | 6/2007 | Beverina et al. | |
| 7,231,353 | B1 | 6/2007 | Goyal | |
| 7,231,395 | B2 | 6/2007 | Fain et al. | |
| 7,389,265 | B2 * | 6/2008 | Lawrence et al. | 705/38 |
| 7,403,922 | B1 | 7/2008 | Lewis et al. | |
| 7,415,607 | B2 | 8/2008 | Sinn | |
| 7,426,489 | B2 | 9/2008 | van Soestbergen et al. | |
| 7,426,492 | B1 | 9/2008 | Bishop et al. | |
| 7,428,756 | B2 | 9/2008 | Wookey | |
| 7,437,310 | B1 | 10/2008 | Dutta | |
| 7,451,114 | B1 | 11/2008 | Matsuda et al. | |
| 7,461,250 | B1 | 12/2008 | Duane et al. | |
| 7,506,158 | B2 | 3/2009 | Fox et al. | |
| 7,523,054 | B2 | 4/2009 | Tyson-Quah | |
| 7,552,466 | B2 | 6/2009 | Rosenberg et al. | |
| 7,562,212 | B2 | 7/2009 | Beattie et al. | |
| 7,593,892 | B2 * | 9/2009 | Balk et al. | 705/38 |
| 7,620,556 | B1 | 11/2009 | Ross | |
| 7,650,496 | B2 | 1/2010 | Thornton et al. | |
| 7,653,810 | B2 | 1/2010 | Thornton et al. | |

| | | |
|---|---|---|
| 7,657,482 B1 | 2/2010 | Shirey et al. |
| 7,694,135 B2 | 4/2010 | Rowan et al. |
| 7,698,549 B2 | 4/2010 | Thornton et al. |
| 7,698,557 B2 | 4/2010 | Saarepera et al. |
| 7,708,200 B2 | 5/2010 | Helsper et al. |
| 7,711,637 B2 * | 5/2010 | Lawrence ............... 705/38 |
| 7,711,950 B2 | 5/2010 | Orbke et al. |
| 7,752,154 B2 | 7/2010 | Friedlander et al. |
| 7,813,944 B1 | 10/2010 | Luk et al. |
| 7,904,361 B2 | 3/2011 | Lawrence |
| 7,930,228 B1 | 4/2011 | Hawkins et al. |
| 2001/0001014 A1 | 5/2001 | Akins et al. |
| 2001/0011243 A1 | 8/2001 | Dembo et al. |
| 2001/0016833 A1 | 8/2001 | Everling et al. |
| 2001/0018674 A1 | 8/2001 | Schein et al. |
| 2001/0027388 A1 | 10/2001 | Beverina et al. |
| 2001/0027389 A1 | 10/2001 | Beverina et al. |
| 2001/0029493 A1 | 10/2001 | Pare. et al. |
| 2001/0037275 A1 | 11/2001 | Johnson et al. |
| 2001/0037318 A1 | 11/2001 | Lindskog et al. |
| 2001/0044768 A1 | 11/2001 | Wares |
| 2001/0047279 A1 | 11/2001 | Gargone |
| 2001/0047347 A1 | 11/2001 | Perell et al. |
| 2001/0049651 A1 | 12/2001 | Selleck |
| 2001/0049793 A1 | 12/2001 | Sugimoto |
| 2001/0054020 A1 | 12/2001 | Barth et al. |
| 2001/0056359 A1 | 12/2001 | Abreu |
| 2002/0016854 A1 | 2/2002 | Hirasawa et al. |
| 2002/0019804 A1 | 2/2002 | Sutton |
| 2002/0029249 A1 | 3/2002 | Campbell et al. |
| 2002/0032626 A1 | 3/2002 | DeWolf et al. |
| 2002/0032635 A1 | 3/2002 | Harris et al. |
| 2002/0032646 A1 | 3/2002 | Sweeney et al. |
| 2002/0032665 A1 | 3/2002 | Creighton et al. |
| 2002/0035520 A1 | 3/2002 | Weiss |
| 2002/0035543 A1 | 3/2002 | Shedd et al. |
| 2002/0035685 A1 | 3/2002 | Ono et al. |
| 2002/0046053 A1 | 4/2002 | Hare et al. |
| 2002/0059093 A1 | 5/2002 | Barton et al. |
| 2002/0062438 A1 | 5/2002 | Asay et al. |
| 2002/0069084 A1 | 6/2002 | Donovan |
| 2002/0087454 A1 | 7/2002 | Calo et al. |
| 2002/0087455 A1 | 7/2002 | Tsagarakis et al. |
| 2002/0091622 A1 | 7/2002 | Mastwyk et al. |
| 2002/0091635 A1 | 7/2002 | Dilip et al. |
| 2002/0091706 A1 | 7/2002 | Anderson et al. |
| 2002/0099640 A1 | 7/2002 | Lange |
| 2002/0099649 A1 | 7/2002 | Lee et al. |
| 2002/0099651 A1 | 7/2002 | May |
| 2002/0103744 A1 | 8/2002 | Llewelyn |
| 2002/0103747 A1 | 8/2002 | Lawrence |
| 2002/0103852 A1 | 8/2002 | Pushka |
| 2002/0107767 A1 | 8/2002 | McClair et al. |
| 2002/0111890 A1 | 8/2002 | Sloan et al. |
| 2002/0120477 A1 | 8/2002 | Jinnett |
| 2002/0120582 A1 | 8/2002 | Elston et al. |
| 2002/0128939 A1 | 9/2002 | Tarrant |
| 2002/0128945 A1 | 9/2002 | Moss et al. |
| 2002/0128952 A1 | 9/2002 | Melkomian et al. |
| 2002/0128964 A1 | 9/2002 | Baker et al. |
| 2002/0129255 A1 | 9/2002 | Tsuchiyama et al. |
| 2002/0133442 A1 | 9/2002 | Laycock |
| 2002/0138371 A1 | 9/2002 | Lawrence et al. |
| 2002/0138407 A1 | 9/2002 | Lawrence et al. |
| 2002/0138408 A1 | 9/2002 | Lawrence |
| 2002/0138417 A1 | 9/2002 | Lawrence |
| 2002/0139837 A1 | 10/2002 | Spitz et al. |
| 2002/0143562 A1 | 10/2002 | Lawrence |
| 2002/0143693 A1 | 10/2002 | Soestbergen et al. |
| 2002/0152156 A1 | 10/2002 | Tyson-Quah |
| 2002/0161707 A1 | 10/2002 | Cole et al. |
| 2002/0184068 A1 | 12/2002 | Krishnan et al. |
| 2002/0188861 A1 | 12/2002 | Townsend |
| 2002/0194014 A1 | 12/2002 | Starnes et al. |
| 2002/0198827 A1 | 12/2002 | van Leeuwen |
| 2003/0009418 A1 | 1/2003 | Green et al. |
| 2003/0018483 A1 | 1/2003 | Pickover et al. |
| 2003/0018522 A1 | 1/2003 | Denimarck et al. |
| 2003/0023543 A1 | 1/2003 | Gunewardena et al. |
| 2003/0050718 A1 | 3/2003 | Tracy et al. |
| 2003/0065613 A1 | 4/2003 | Smith |
| 2003/0065942 A1 | 4/2003 | Lineman et al. |
| 2003/0066872 A1 | 4/2003 | McClure et al. |
| 2003/0069742 A1 | 4/2003 | Lawrence |
| 2003/0069821 A1 | 4/2003 | Williams |
| 2003/0069894 A1 | 4/2003 | Colter et al. |
| 2003/0074272 A1 | 4/2003 | Knegendorf et al. |
| 2003/0074310 A1 | 4/2003 | Grovit et al. |
| 2003/0138407 A1 | 7/2003 | Lu et al. |
| 2003/0145124 A1 | 7/2003 | Guyan et al. |
| 2003/0163398 A1 | 8/2003 | Yoshioka et al. |
| 2003/0167177 A1 | 9/2003 | Branch |
| 2003/0167237 A1 | 9/2003 | Degen et al. |
| 2003/0172017 A1 * | 9/2003 | Feingold et al. ............... 705/35 |
| 2003/0177087 A1 | 9/2003 | Lawrence |
| 2003/0187790 A1 | 10/2003 | Swift et al. |
| 2003/0195843 A1 | 10/2003 | Matsuda et al. |
| 2003/0233297 A1 | 12/2003 | Campbell |
| 2004/0024693 A1 | 2/2004 | Lawrence |
| 2004/0039704 A1 | 2/2004 | Gilliam et al. |
| 2004/0054563 A1 * | 3/2004 | Douglas ............... 705/7 |
| 2004/0111379 A1 | 6/2004 | Hicks et al. |
| 2004/0193532 A1 | 9/2004 | Lawrence |
| 2004/0215557 A1 | 10/2004 | Michelsen |
| 2005/0080716 A1 | 4/2005 | Belyi et al. |
| 2005/0086090 A1 | 4/2005 | Abrahams et al. |
| 2005/0144114 A1 | 6/2005 | Ruggieri et al. |
| 2005/0187841 A1 | 8/2005 | Grear et al. |
| 2006/0010063 A1 | 1/2006 | Drummond et al. |
| 2006/0089894 A1 * | 4/2006 | Balk et al. ............... 705/35 |
| 2006/0116898 A1 * | 6/2006 | Peterson ............... 705/1 |
| 2006/0218651 A1 | 9/2006 | Ginter et al. |
| 2007/0005496 A1 | 1/2007 | Cataline et al. |
| 2007/0038544 A1 | 2/2007 | Snow et al. |
| 2007/0061594 A1 | 3/2007 | Ginter et al. |
| 2007/0219882 A1 | 9/2007 | May |
| 2007/0288355 A1 | 12/2007 | Roland et al. |
| 2008/0021835 A1 | 1/2008 | Ginter et al. |
| 2008/0077530 A1 * | 3/2008 | Banas et al. ............... 705/50 |
| 2008/0319922 A1 | 12/2008 | Lawrence et al. |
| 2008/0320092 A1 | 12/2008 | Campbell et al. |
| 2009/0031127 A1 | 1/2009 | Campbell et al. |
| 2009/0043687 A1 | 2/2009 | van Soestbergen et al. |
| 2009/0132813 A1 | 5/2009 | Schibuk |
| 2009/0187761 A1 | 7/2009 | Campbell et al. |
| 2009/0299896 A1 | 12/2009 | Zhang et al. |
| 2009/0319420 A1 | 12/2009 | Sanchez et al. |
| 2010/0138262 A1 * | 6/2010 | Lawrence ............... 705/7 |
| 2010/0235300 A1 * | 9/2010 | Feingold ............... 705/36 R |

FOREIGN PATENT DOCUMENTS

| | | |
|---|---|---|
| EP | 0999489 | 5/2000 |
| EP | 1137209 | 9/2001 |
| EP | 1143365 | 10/2001 |
| JP | 02000020618 A | 6/1998 |
| JP | 0200002061 | 1/2000 |
| JP | 02000350896 A | 8/2001 |
| JP | 0200305089 | 2/2003 |
| WO | WO0075836 | 12/2000 |
| WO | WO0155885 | 8/2001 |
| WO | WO02075485 | 9/2002 |

OTHER PUBLICATIONS

Written Opinion from PCT/US03/19198 dated Jul. 6, 2004.
International Search Report corresponding to PCT/US03/24373 dated Jun. 15, 2004.
International Preliminary Examination Report corresponding to PCT/US03/24373 dated May 2, 2005.
"PCT Notification of Transmittal of the International Search Report", mailed Jul. 6, 2005, for PCT/U504/03766.
"Commentary: Foreign Assets Control Regulations: The Countries Aren't Enough", Letter of Credit Update, Mar. 1996, pp. 23-27.
"Enterprise Anti-Money Laundering Product Specification." Mantas, 2001.
"Firms Consider Pact to Track Terror Money." Wall Street Journal, Nov. 26, 2001. cited by other.
"Five Ways to Reduce Risk with Neutral Networks." Credit Risk Management Report, vol. 3, Jun, 27, 1993.

"OFAC Compliance: A Perspective for Community Banks", ABA Bank Compliance Nov./Dec. 1998, pp. 39-48.
"Specially designatedWho? Primer on OFAC Compliance" ABA Bank Compliance Mar./Apr. 1996, pp. 29-36.
"Transforming Discovery Into Opportunity": "Key Personnel Bios"; " Frequently Asked Questions"; Mantas, Mantas, Inc., Announces Funding and Management Team:, Mantas, Jun. 2001. "Safeguard and SRA Partner to Launch Mantas, Inc.", Mantas., "Knowledge Discovery Platform"; "Money Laundering Detection for Banks"; "Fraud and Money Laundering Detection for Securities Firms"; "Best Exuectition"; "Equities Trading Compliance", Mantas.
Aguais Scott D. "It's the Economy." Credit Card Management, vol. 5, 1993, pp. 58-60.
Anonymous. "Information available at the web site of insuremarket". Feb. 20, 1999. 6 pages.
Anonymous. InsureZone's AgentSecure Expands by Adding Life and Disability Insurance to its Existing Commercial P&C Product Set. PR Newswire. No. 11920919. May 13, 2002. Page 1.
Anthony Mills article "A systematic approach to risk management for construction", Structural Survey, vol. 19, No. 5, p. 245, 2001.
Axciom®, PerformanceData to Link List Databases; AGreement Provides Credit Data, Real Property/Demographic Data, PR Newswire, Jul. 27, 1999, 3 pages.
Banasiak, Michael, "Don't be Out-Scored by Competition", Credit and Financial Management Review, 2nd Quarter 2000.
Barrett, Jennifer, "Banking on Software Solutions", Newsweek Web, Jun. 12, 2002.
Business Editors, Tarrant Apparel Group Announces Exercise of LDA Option Limit Now Holds 7.3% Interest in Tarrant, Oct. 22, 1998, Business Wire, p. 1-3.
Capitol Briefs, Arizona Daily Star, Feb. 5, 1997, p. 3.B.
Carreker-Antinori Forms Risk Management Unit: New Service Helps Banks Identify, Reduce Operations Risk, Nov. 17, 1997, http://www.carreker.com/main/media/press_releases/releases1997/11-17-97.htm, 2 pages.
Casino Gambling in New Jersey—A Report to the National Gambling Impact Study Commission, New Jersey Casino Control Commission, Jan. 1998 (57 pages).
Caudill, Maureen et al., "Naturally inteiligent Systems," The MIT Press, 1990.
Cetron, Martin; Keystone, Jay; Shlim, David; Steffen, Robert. "Travelers' Health". Jul.-Sep. 1998. Emerging Infectious Diseases. vol. 4, Issue 3.
Chandler, Gary "Credit Scoring,: A Feasibility Study." Executive, 1985.
Dave Berns's article, Resort Owners Seek Loans, Los Vegas Review Journal, Nov 16, 1999, p. 1.D.
EPA Asbestos Ban: Calrification May 18, 1999, retrieved from http://www.epa.gov/asbestos/pubs/asbbans2.pdf, May 29, 2008. cited by examiner.
EPA Asbestos Ban: Clarification May 18, 1999, retrieved from http://lxww.epa.Fov/asbestos/nubsiasbbans2.pdf, May 29, 2008.
Everest-Hill, Deborah "Automating Risk Assessment." the Internal Auditor, vol. 55, Jun. 1999, pp. 23-25.
FTC Settles with Debt Collection Agency, Credit Risk Management Reporter, Sep. 5, 2000, vol. 10, Iss 17, p. 1 op.
George Weir, Can Fiduciaries Avoid Liability Under Environmental Law?, Estate Planning, Jul./Aug 1992, vol. 19, pp. 1-2.
Grafton:. David, "Analysing Customers With Behavioural Modelling," Credit Control, vol. 17,1995, pp. 27-31.
Gramm-Leach-Bliley Act enacted Nov. 12, 1999 Exceptions to Notice and Opt-Out Requirements: Section 313.15.
Guile. Karen "Neutral Nets Versus Card Fraud; Chase's Software Learns to Detect Potential Crime." The American Banker, Feb. 2, 1990.
Healy, Thomas J. "The New Science of Borrower Behavior." Factiva, Feb. 1, 1998.
Hicks M., "What, me spam?" Good intentions alone aren't enough to avoid alienating customers, eWeek Sep, 3, 2001, retrieved from DIALOG DIALOG No.: 08984023. see abstract.
Higgins, Kevin T. "Retention by the Numbers." Credit Card Management, vol. S, 93, pp. 52-56.
International Preliminary Examination Report dated Jun. 15, 2004 for PCT/US02/39260.
International Preliminary Examination: Report dated Mar. 16, 2005 for PCT/US03/17935.
International Preliminary Examination Report dated Oct. 9, 2002 for PCT/US02/07110.
International Preliminary Examination Oil Report from PCT/US03/19242 dated Mar. 31, 2005.
International Search Report dated Feb. 3, 2003 for PCT/US02/07110.
International Search Report dated Jun. 19, 2003 for PCT/US03/07337.
International Search Report dated Jun. 24, 2004 for PCT/US03/018273. cited by other.
International Search Report dated Jun. 2, 2003 for PCT/ US03/03993.
International Search Report dated May 30, 2003 for PCT/US02/24123.
International Search Report dated Oct. 1, 2003 for PCT/US03/03994.
International Search Report dated Oct. 7, 2003 for PCT/US03/17935.
International Search Report from PCT/US02/39260 dated Sep. 9, 2003.
International Search Report from PCT/US03/13169 dated Dec. 2, 2003.
International Search Report from PCT/US03/18273 dated Jun. 24, 2004.
International Search Report from PCT/US03/18430 dated Dec. 22, 2003. cited by other.
International Search Report from PCT/US03/19219 dated Dec. 15, 2003.
international Search Report from PCT/US03/19242 dated Dec. 3, 2003.
International Search Report from PCT/US03/19376 dated Dec. 4, 2003. cited by other.
International Search Report from PCT/US03/23033 dated Apr. 9, 2004.
International Search Report from PCT/US03/23310 dated Jun. 18, 2004. cited by other.
Leonard, Kevin J. And William J. Banks. "Automating the Credit Decision Process," Journal of Retail Banking, vol. 16,1994, p. 39.
Marc Schniederjans, Strategic Acquisition Management: A Multi-Objective Synergistic Approach, The Journal of the Operational Research Society, vol. 40, No. 4 Apr. 1989 (pp. 333-345).
McLure, Leslie "Taking the Risk Out of Transactions." Factiva, Mar. 1, 1994.
Pourer, Stephen "Background Checks Await Fliers." The Wall Street Journal; Jun, 7, 2002.
Preparation Guidelines for Suspicious Activity Report Form (SAR) and the SAR PC Software User Guide of the Internal Revenue Service, found on www.archive.org of Jun. 3, 2000 (p. i-61).
Proprietary Right, Collins Dictionary of Law. London, WJ Stewart 2006.
Purcell, Lea "Roping in Risk." Factiva, May 1, 1994.
Quinn, Jane Bryant "Credit Card Issuers; Keeping a Closer Watch on How You Pay Bills," Washington Post, Apr. 25, 1988.
Ralph Vartabedian, US Mounts High-Stakes Computer Reform Effort; Technology: The aim is to reverse decades of failing performance. Experts are encouraged at changes' breadth. Series: Fedearl Computers: Is System Haywire? Last of Three Parts, Los Angeles Times Dec. 10, 1996, 2 pages.
Regulatory Risks, Detroit News, Sep. 20, 1999, 2 pages.
Retailing: Casino, Cora Create Joint Buying Venture, The Wall Street Journal, Apr. 20, 1999, p. 1.
Richard N. Clarke's article SICs as a Definition of Economic Markets, published in The Journal of Business, vol. 62, No. 1, Jan. 1989, p. 17-31. cited by examiner.
Sinkey, J.F. Commercial Bank Financial Management in the financial Services Industry 4th Edition McMillian Publishing Co New York, 1992 p. 156.
The Federal Trade Commission's article Fair Credit Reporting, Mar. 1999, retrieved from http://www.pueblo.gsa.gov/cic.sub.—text/money/fair-credit/fair-crd.htm, May 29, 2008. cited by examiner.
Tony Batt, Indians protest proposed changes in gaming regulations, Las Vegas Review Apr. 27, 1994, 1 page.
Toshio Airtake, Japanese Government Panel recommends new laws to protect personal information, BNA's Banking Report, Dec. 6, 1999, p. 1.
U.S. General Services Administration. 41 Code of Federal Regulations, Chapters 300-304. Jul. 1, 1997 Edition. pp. 10-18 retrieved from <http://www.gsa.gov/federaltraveiregulation>.
Written Opinion dated Oct. 7, 2003 for PCT/US03/03993.
Written Opinion from PCT.US03/19242 dated Jun. 21, 2004.

* cited by examiner

PROPRIETARY RISK MANAGEMENT CLEARINGHOUSE

CROSS REFERENCE TO RELATED APPLICATIONS

This application claims the benefit of the filing date of U.S. Provisional application No. 60/390,459 entitled "Proprietary Risk Management", filed Jun. 20, 2002. This application is a continuation-in-part of a prior application entitled "Risk Management Clearinghouse" filed Feb. 12, 2002 and bearing the Ser. No. 10/074,584 now abandoned, as well as being a continuation-in-part of a prior application entitled "Risk Management Clearinghouse" filed Oct. 30, 2001, and bearing the Ser. No. 10/021,124 now abandoned, which is also a continuation-in-part of a prior application entitled "Automated Global Risk Management" filed Mar. 20, 2001, and bearing the Ser. No. 09/812,627, all of which are relied upon and incorporated by reference.

BACKGROUND

This invention relates generally to a method and system for facilitating the identification, investigation, assessment and management of legal, regulatory financial and reputational risks ("Risks"). In particular, the present invention relates to a computerized system and method for banks and non-bank financial institutions to access information compiled on a worldwide basis and relate such information to a risk subject, such as a transaction at hand, wherein the information is conducive to quantifying and managing financial, legal, regulatory and reputational risk associated with the transaction.

As money-laundering and related concerns have become increasingly important public policy concerns, regulators have attempted to address these issues by imposing increasing formal and informal obligations upon financial institutions. Government regulations authorize a broad regime of record-keeping and regulatory reporting obligations on covered financial institutions as a tool for the federal government to use to fight drug trafficking, money laundering, and other crimes. The regulations may require financial institutions to file currency and monetary instrument reports and to maintain certain records for possible use in tax, criminal and regulatory proceedings. Such a body of regulation is designed chiefly to assist law enforcement authorities in detecting when criminals are using banks and other financial institutions as intermediaries for, or to hide the transfer of funds derived from, criminal activity.

Obligations include those imposed by the Department of the Treasury and federal banking regulators which adopted suspicious activity report ("SAR") regulations. These SAR regulations require that financial institutions file SARs whenever an institution detects a known or suspected violation of federal law, or a suspicious transaction related to a money laundering activity or a violation of the Bank Secrecy Act (BSA). The regulations can impose a variety of reporting obligations on financial institutions. Perhaps most broadly relevant for the present invention, they require an institution to report transactions aggregating to $5,000 that involve potential money laundering or violations if the institution, knows, suspects, or has reason to suspect that the transaction involves funds from illegal activities, is designed to disguise such funds, has no business or legitimate purpose, or is simply not the sort of transaction in which the particular customer would normally be expected to engage, and the institution knows of no reasonable explanation for the transaction after examining the available facts.

For example, banks must retain a copy of all SARs and all supporting documentation or equivalent business records for 5 years from the date of the filing of the SAR. Federal banking regulators are responsible for determining financial institutions' compliance with the BSA and implementing regulations.

Federal regulators have made clear that the practical effect of these requirements is that financial institutions are subject to significant obligations to "know" their customer and to engage in adequate monitoring of transactions.

Bank and non-bank financial institutions, including: investment banks; merchant banks; commercial banks; securities firms, including broker dealers securities and commodities trading firms; asset management companies, hedge funds, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory risks and associated obligations, hereinafter collectively referred to as "Financial Institutions," typically have few resources available to them to assist in the identification of present or potential risks associated with business transactions.

Risk can be multifaceted and far reaching. Generally, personnel do not have available a mechanism to provide real time assistance to assess a risk factor or otherwise qualitatively manage risk. In the event of problems, it is often difficult to quantify to regulatory bodies, shareholders, newspapers and other interested parties, the diligence exercised by the Financial Institution to properly identify and respond to risk factors. Absent a means to quantify good business practices and diligent efforts to contain risk, a Financial Institution may appear to be negligent in some respect.

Risk associated with an account involved in international transactions can be greatly increased due to the difficulty in gathering and accessing pertinent data on a basis timely to managing risk associated with the transaction. As part of due diligence associated with performing financial transactions, it may be important for a Financial Institution to "Know Their Customer" including whether a customer is contained on a list of restricted entities published by the Office of Foreign Access Control (OFAC), the Treasury Office or other government or industry organization.

What is needed is a method and system to draw upon information gathered and utilize the information to assist with risk management and due diligence related to financial transactions. A new method and system should anticipate offering guidance to personnel who interact with clients and help the personnel identify high risk situations. In addition, it should be situated to convey risk information to a compliance department and be able to demonstrate to regulators that a Financial Institution has met standards relating to risk containment.

SUMMARY

Accordingly, the present invention provides a risk management method and system for facilitating analysis and quantification of risk associated with a financial transaction. A proprietary risk management clearinghouse (PRM) system maintains a database that can relate risk variables including confidential and non-confidential information, such as information relating to prior transactions and accounts, world events, government advisories, and other information. The PRM system can be accessed directly or tied into front end or backend systems to automatically monitor transactions. A rating system is used to assess risk based upon criteria such as risk advisories, historical data, interpretation of world events or other variables that can affect risk.

A PRM system can generate a risk quotient or other rating based upon a weighted algorithm applied to the variables, wherein the risk quotient is indicative of risk associated with a transaction or an account. The quotient can be monitored on a periodic basis, during the course of a transaction, upon account opening or on demand. Actions commensurate with a risk quotient can be presented to a Financial Institution to help the institution properly manage risk associated with a particular entity or transaction, or other risk subject.

One or more reports can also be generated which are related to one or more risk variables searched by the PRM system 112. In various embodiments, the reports can include informational data returned by a Risk query, any related informational artifacts, descriptions of informational artifacts, other data related to one or more risk variables or compilation or summary of data related to one or more risk variable, one or more risk quotients or other quantitative value for a Risk assessment or summaries of information resulting from any related Risk inquiry. The reports can include, for example, any one or more of: informational data, informational artifacts and descriptions of informational artifacts, one or more risk quotients.

Some implementations of the present invention provide computer implemented methods and systems for managing Risks wherein data descriptive of informational artifacts and with content related to Risks, such as, for example, at least one of: reputational risk, regulatory risk and legal risk; can be received into a computer system. Risk variables can be defined which are generally related to one or more financial transactions. Proprietary data descriptive of a particular financial transaction can also be received into the computer system and one or more risk variables identified with the received data descriptive of the financial transaction.

Informational artifacts with content related to Risk can be associated with the risk variables identified and a report can be generated for use within a predefined organization. The report can include, for example, a description of the informational artifacts associated with the risk variables identified.

In some embodiments a suggested action can be generated based upon the content of the informational artifacts. Some embodiments can also include generation of a risk quotient that is indicative of an amount of Risk.

Still other embodiments can include methods and systems for conducting a financial transaction. Details descriptive of a particular financial transaction can be transmitted to a computer system accessible via a communications network. The computer server can be operative with executable software to receive the details descriptive of the particular financial transaction and also receive data descriptive of informational artifacts with content related to Risk, such as for example, at least one of: reputational risk, regulatory risk and legal risk. One or more risk variables can be identified with the data descriptive of the particular financial transaction and at least one informational artifact can be associated with the risk variables identified. The computer server can transmit the data descriptive of the content of the informational artifact that is associated with the risk variables to a subscriber conducting the financial transaction.

The subscriber can receive the data descriptive of the content of the informational artifact and determine a course of action related to the financial transaction based upon the received data.

In another aspect, the present invention can include a method and system for a user to interact with a network access device so as to manage risk relating to a risk subject. The user can initiate interaction with a proprietary risk management server via a communications network and input information relating to details of the risk subject, such as, for example, via a graphical user interface, and receive back a risk quotient indicative of a level of risk associated with the risk subject. A user can also receive a suggested action designed to mitigate risk associated with the risk subject. The risk quotient can be, for example a numerical value and a typical risk subject may be a particular Financial Transaction.

Various features and embodiments are further described in the following figures, drawings and claims.

DETAILED DESCRIPTION

Figure 1:
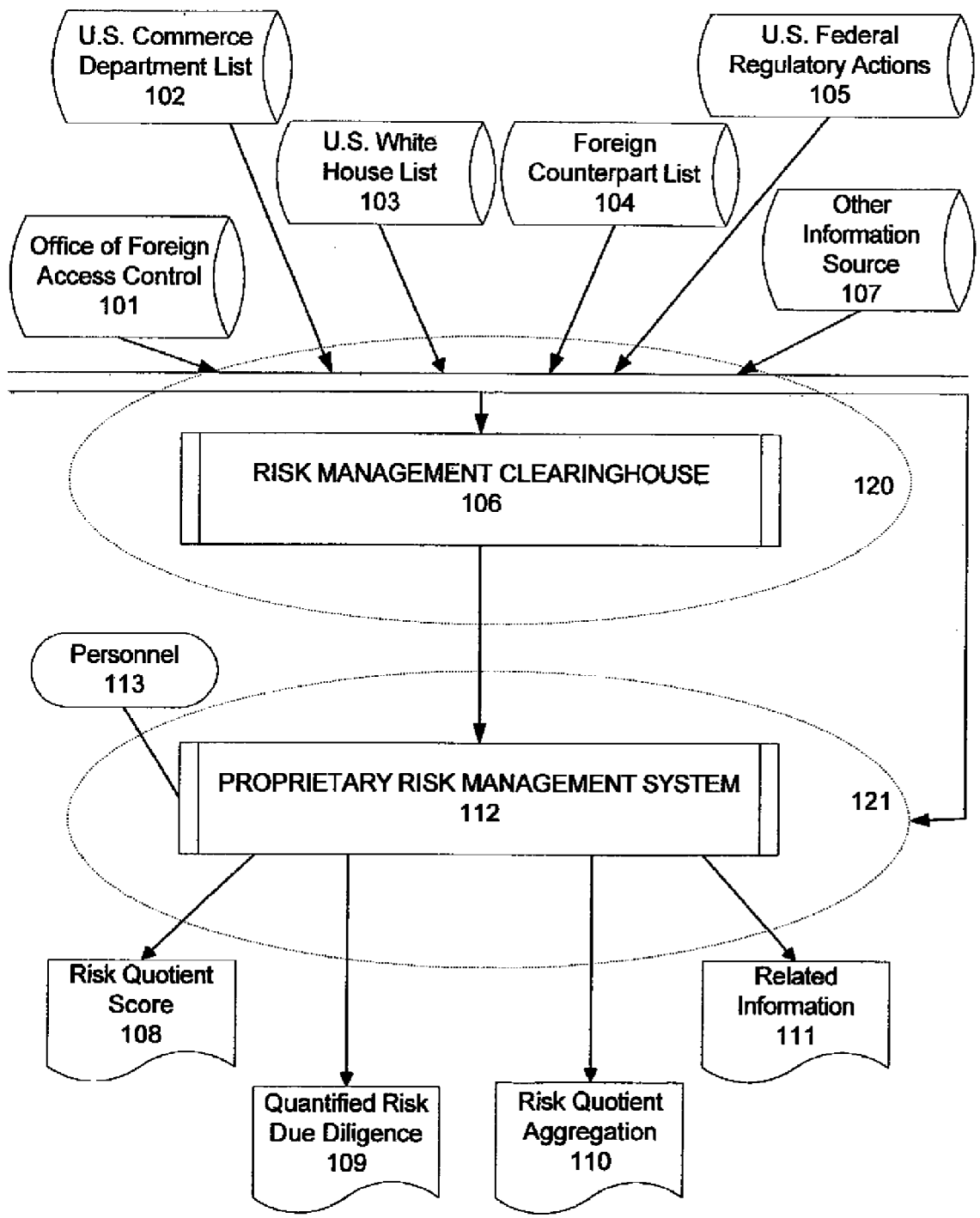
FIG. 1 illustrates a block diagram that can embody this invention.

The present invention includes a computerized method and system for managing risk associated with Financial Transactions including those with international exposure. A computerized system gathers and stores information in a database or other data storing structure and relates the information to Risk factors pertaining to Financial Transactions. Informational Artifacts and/or data descriptive of Informational Artifacts and a source of any Information Artifact can also be stored. A Subscriber, such as a Financial Institution, can receive information from a Risk management clearinghouse and, if desired, also supply information, into a proprietary database and query the database. Queries can be automated and made a part of standard operating procedure for each transaction conducted by the Subscriber. In some embodiments, a rating system can be used by a Subscriber to assess risk based upon the information received and the Risk factors.

Definitions:

Financial Institution: Financial Institution refers to any person, entity, company, corporation or statutory "person" in the business of providing Financial Transactions. As such, as used herein, a Financial Institution can collectively and individually include: Bank and non-bank financial institutions, including: investment banks; merchant banks; commercial banks; securities firms, including broker dealers securities and commodities trading firms; asset management companies, other hedge fund s, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory risks and associated obligations.

Financial Transaction: a Financial transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions; a transaction involving any transfer of funds and: an insurance company, a credit card issuer, a trading exchange, a government regulator, a law enforcement agency, an investment and/or merchant bank, public and private financing, commodities and securities trading, commercial and consumer lending, asset management, a rating of corporations and securities, public and private equity investments, public and private fixed income investments, the listing of companies on securities exchanges and bourses; and employee screening.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Proprietary Risk Management Clearinghouse (PRM): PRM refers to computerized systems and methods available to Subscribers permitted to access the computerized systems under the authorization of a parent entity. The computerized systems and methods being utilized for managing Risks and associating information and/or informational artifacts useful for quantifying Risk with a Risk subject. Generally, the functionality of a PRM is equivalent to functionality provided by an RMC system, except that data stored in the PRM and access to the PRM can be kept proprietary to the parent entity or some other designated group of users.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: 10/074,584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Subscriber: Subscriber refers to any person or entity authorized to access an RMC system 106.

Transaction Participant: Transaction Participant refers to a person who will partake in a Financial transaction.

Elements

Referring now to FIG. 1 a block diagram of one embodiment of the present invention is illustrated. A Risk Management Clearinghouse (RMC) system 106, receives information which may be related to a Financial Transaction, or a participant to a Financial Transaction. Information is received, for example, from publicly available sources, Subscribers, investigation entities, or other sources. The information is constantly updated and can be related to a Financial Transaction or an alert list in order to facilitate compliance with regulatory requirement. Updated information is transmitted to a Proprietary Risk Management (PRM) system 112. The PRM system 112 can be utilized to perform risk management functions for a Subscriber institution 121.

Typically a Subscriber 121 will house a computerized PRM system 112 that receives an electronic feed from a PRM system 112. A Subscriber 121 can include, for example: a securities broker, a retail bank, a commercial bank, investment and merchant bank, private equity firm, asset management company, a mutual fund company, a hedge fund firm, insurance company, a credit card issuer, retail or commercial financier, a securities exchange, a regulator, a money transfer agency, or other entity.

Public information can be received into the RMC system 106 or the PRM system 112 from a variety of sources, including, for example: a list generated by the Office of Foreign Assets Control (OFAC) 101 including their sanction and embargo list, a list generated by the U.S. Commerce Department 102, a list of international "kingpins" generated by the U.S. White House 103, U.S. regulatory actions 104 or other information source 105 such as a foreign government, U.S. adverse business-related media reports, U.S. state regulatory enforcement actions, international regulatory enforcement actions, international adverse business-related media reports, a list of politically connected individuals and military leaders, list of U.S. and international organized crime members and affiliates or a list of recognized high risk countries. Court records or other references relating to fraud, bankruptcy, professional reprimand or a rescission of a right to practice, suspension from professional ranks, disbarment, prison records or other source of suspect behavior can also be an important source of information.

Information entered by a Subscriber into a PRM system 112 may be information gathered according to normal course of dealings with a particular entity or as a result of a concerted investigation. In addition, since the PRM system is proprietary and a Subscriber responsible for the information contained therein can control access to the information contained therein, the PRM system can include information that is public or proprietary.

However, if desired, it can be made possible for information entered into the PRM system 112 to be shared with a RMC system 106 which contains informational data generally available to other Subscribers who may not be held by any duty of confidentiality and/or available to the public as a whole. Informational data can be shared, for example via an electronic transmission or transfer of electronic media. However, PRM system 112 data may be subject to applicable to local or national law and safeguards should be adhered in order to avoid violation of such law through data sharing practices. In the event that a Subscriber, or other interested party, discovers or suspects that a person or entity is involved in a fraudulent or otherwise illegal activity, the system can report related information to an appropriate authority.

A Financial Institution will often be closely regulated. As a result Financial Institutions are exposed to significant risks from their obligations of compliance with the law and to prevent, detect and, at times, report potential violations of laws, regulations and industry rules ("laws"). These risks include, but are not limited to, the duty to disclose material information, and to prevent and possibly report: fraud, money laundering, foreign corrupt practices, bribery, embargoes and sanctions. Through a series of structured questions and weighting of information received as answers, Financial Institutions can structure a risk exposure and receive suggested responses to a specific risk scenario.

A decision by a Financial Institution concerning whether to pursue a Financial Transaction can be dependent upon many factors. A multitude and diversity of risks related to the factors may need to be identified and evaluated. In addition, the weight and commercial implications of the factors and associated risks can be interrelated. The present invention can provide a consistent and uniform method for business, legal, compliance, credit and other personnel of Financial Institutions to identify and assess risks associated with a transaction. A PRM system 112 allows investment activity risks to be identified, correlated and quantified by a Financial Institution on a confidential basis thereby assessing legal, regulatory, financial and reputational exposure.

Types of transactions that may have risk implications can include, for example transactions relating to: an individual account, a public company domiciled in a G-7 country or Hong Kong, a public company not domiciled in a G-7 country or Hong Kong, a corporate account regulated by a G-7 agency or a corporate account regulated by a non G-7 government agency, a private company or partnership, a holding company, an intermediary managed account, such as a money manager or hedge fund, a trust or foundation, or other type of legal entity.

A Financial Institution can integrate a PRM system 112 to be part of legal and regulatory oversight for various due diligence and "know your customer" obligations imposed by regulatory authorities. The PRM system 112 can facilitate detection and reporting of potential violations of law as well as address the "suitability" of a Financial Transaction and/or the assessment of sophistication of a customer. Similarly, the PRM system 112 can support a Financial Institution's effort to meet requirements regarding the maintenance of accurate books and records relating to their Financial Transactions and affirmative duty to disclose material issues affecting an investor's decisions.

In some embodiments, a RMC system 106 provides informational data, informational artifacts, and descriptions of informational artifacts generally related to Risks, as updated input into an in-house risk management database that is part of the PRM system 112. The PRM system 112 can allow a Financial Institution, or other Subscriber, to screen one or more Risk Variables, such as for example: a name of any or all current and/or prospective account holder and/or wire transfer receipt/payment party against the data stored in the PRM System 112 on a very low cost and timely basis.

A log or other stored history can be created by the PRM system 112, such that utilization of the system can mitigate adverse effects relating to a problematic account. Mitigation can be accomplished by demonstrating to regulatory bodies, shareholders, news media and other interested parties that corporate governance is being addressed through tangible risk management processes.

Information relating to financial, legal, regulatory and/or reputational risk is received as data into a computer system contained in the PRM system 112 from a source, such as, for example, a RMC system 106, or other source. Informational data received can be related by keyword, fuzzy logic, artificial intelligence programs, full text, numerical value, financial value, coded entry or other well known or proprietary forms of data manipulation. In one embodiment, a periodic update can be transmitted from the RMC system 106 to the PRM system 112, such as an hourly or daily update. In another embodiment, communication between the RMC system 106 and the PRM system 112 can be consistently maintained, thereby allowing constant real-time interaction between the RMC system 106 and the PRM system 112. Real time interaction can enable a Subscriber 121 to access the most recent data available from the RMC system 106. Use of a PRM system 112 can allow the Subscriber 121 to maintain complete privacy regarding data in the PRM system 112, and also maintain complete privacy as to what queries are run against the databases contained in the PRM system 112.

A PRM system 112 can also execute programmable software which will weight risk related informational data in order to calculate a risk quotient or similar score or rating. The risk quotient can include, for example, a scaled numeric or alpha-numeric value.

If a transaction reaches or exceeds a risk quotient threshold, the PRM system 112, or Subscriber 121 can respond with a responsive action 114. A responsive action 114 can include, for example, generating an alert, blocking acceptance of a transaction, creating a report, notifying a compliance department, notifying an authority, or other appropriate response. In addition, the PRM system 112 can create a structured history relating to a transaction that can demonstrate due diligence and proper corporate governance. Reporting can be generated from the structured history. A benefit of the PRM system 112 reporting and quantified risk due diligence 109 lies in the ability to keep all such reporting confidential if desired.

In the case of an automated transaction, such as, for example, execution of an online transaction, a direct feed of information can be implemented from a front end system involved in the transaction to the PRM system 112 or via questions that are presented to a transaction initiator by a programmable robot via a GUI. Questions can relate to a particular type of account, a particular type of client, types of investment, or other criteria. Other prompts or questions can aid a Financial Institution ascertain the identity of an account holder and an account's beneficial owner. If there is information indicating that a proposed transaction is related to an account that is beneficially owned by a high risk entity, the Financial Institution may not wish to perform the transaction if it is unable to determine the identity of the high risk entity and his or her relationship to the account holder.

The PRM system 112 can also receive open queries, such as, for example, from Subscriber personnel not necessarily associated with a particular transaction. An open query may, for example, search for information relating to an individual or circumstance not associated with a Financial Transaction and/or provide questions, historical data, world event information and other targeted information to facilitate a determination of risk associated with a risk subject, such as a query regarding an at risk entity's source of wealth or of particular funds involved with an account or transaction in consideration.

A query can also be automatically generated from monitoring transactions being conducted by a Subscriber 121. For example, an information system can electronically scan transaction data for key words, entity names, geographic locales, or other pertinent data. Programmable software can be utilized to formulate a query according to suspect names or other pertinent data and run the query against a database maintained by the PRM system 112. Other methods can include voice queries via a telephone or other voice line, such as voice over internet, fax, electronic messaging, or other means of communication. A query can also include direct input into a PRM system 112, such as through a graphical user interface (GUI) with input areas or prompts.

Prompts or other questions proffered by the PRM system 112 can also depend from previous information received. Information generally received, or received in response to the questions, can be input into the PRM system 112 from which it can be utilized for real time risk assessment and generation of a risk quotient 108.

An alert list containing names and/or terms of interest to a Subscriber can be supplied to the PRM system 112 by a Subscriber 121 or other source. Embodiments can include each list being customized and specific to a Subscriber. The PRM system 112 can continually monitor data in its database via an alert query with key word, fuzzy logic or other search algorithms and transmit related informational data to the interested party. In this manner, ongoing diligence can be conducted. In the event that new information is uncovered by the alert query, the Subscriber can be immediately notified, or notified according to a predetermined schedule. Appropriate action can be taken according to the information uncovered.

A risk assessment or risk quotient 108 can be made available to the Subscriber 121 or personnel interested in the transaction 107. In one embodiment, the risk quotient 108 can be assessed in real time. A real time assessment can allow a Subscriber 121 or other interested party to provide a responsive action 114 and/or execute an action to address a particular risk quotient timely to the circumstances resulting in the risk quotient score 108. A responsive action 114 may include; for example, limiting the scope of a transaction entered into, discontinuing a transaction associated with high risk participants, notifying authorities, or other appropriate actions.

The PRM system 112 can quantify risk due diligence 109 by capturing and storing a record of information received and actions taken relating to a RMC transaction. Once quantified, the due diligence data can be utilized for presentation, as appropriate, to regulatory bodies, shareholders, news media and/or other interested parties, such presentation may be useful to mitigate adverse effects relating to a problematic transaction. The data can demonstrate that corporate governance is being addressed through tangible risk management processes.

In some embodiments, the PRM system 112 can generate a quantitative value indicative of an amount of Risk that is associated with a RMC inquiry such as an inquiry related to a particular transaction or a query related to a particular account holder or account beneficiary. The risk quotient can be based upon a weighted algorithm applied to the risk factors. The risk quotient can be made available on a periodic basis, on demand in real time, in response to an event such as a transaction, or according to some other request. Actions commensurate with a risk level can be presented to assist with proper risk management.

In some embodiments, the PRM system 112 can also calculate or otherwise generate an aggregated risk quotient score 110. An aggregated Risk Quotient score can include a sum of all outstanding Risk associated with a Financial Institution or subset of the Financial Institution, such as a particular department or branch, with a certain type of account or investment vehicle, or with a particular account holder or group of account holders. The risk quotient aggregation 110 can be useful in assessing various levels of risk being tolerated by a Financial Institution. Other calculations, such as, for example, the sum, mean, average, or other calculation can be made to further analyze risk at a Financial Institution. If desired, a rating can be applied to an institution according to the amount of risk tolerated by the institution, such as, for example, the average risk tolerated for a transaction.

Systems

Figure 2:
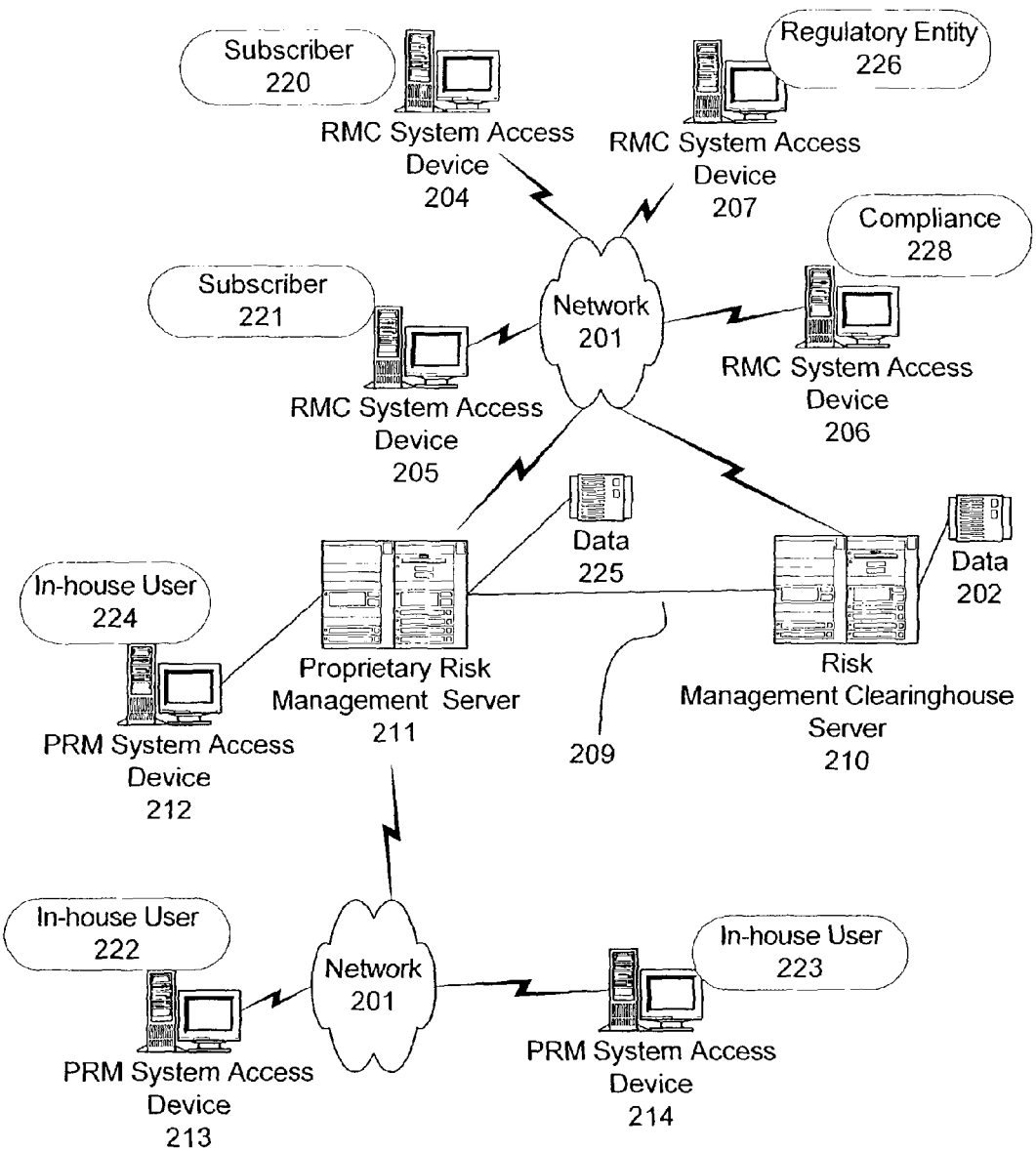
FIG. 2 illustrates a network of computer systems that can embody an automated PRM system.

Referring now to FIG. 2, a network diagram illustrating one embodiment of the present invention is shown 200. An automated PRM system 112 can include a computerized RMC server 210 accessible via a distributed network 201 such as the Internet, or a private network. A Subscriber 220-222, regulatory entity 226, remote user 227, or other party interested in risk management, can use a computerized system or network access device 204-207 to receive, input, transmit or view information processed in the RMC server 210. A protocol, such as the transmission control protocol internet protocol (TCP/IP) can be utilized to provide consistency and reliability.

In addition, a PRM server 211 can access the RMC server 210 via the network 201 or via a direct link 209, such as a T1 line or other high speed pipe. The PRM server 211 can in turn be accessed by an in-house user 222-224 via a system access device 212-214 and a distributed network 201, such as a local area network, or other private network, or even the Internet, if desired. An in-house user 224 can also be situated to access the PRM server 211 via a direct linkage, or any other system architecture conducive to a particular need or situation. In one embodiment, a remote user can access the PRM server 211 via a system access device 204-207 also used to access other services, such as an RMC server 210.

A computerized system or system access device 204-207 212-214 used to access the PRM system 211 can include a processor, memory and a user input device, such as a keyboard and/or mouse, and a user output device, such as a display screen and/or printer. The system access devices 212-214 can communicate with the PRM server 112 to access data and programs stored at the PRM server 211. The system access device 212-214 may interact with the PRM system 211 as if the PRM system 211 was a single entity in the network 200. However, the PRM system 211 may include multiple processing and database sub-systems, such as cooperative or redundant processing and/or database servers, that can be geographically dispersed throughout the network 200.

The PRM server 211 includes one or more databases 225 storing data relating to proprietary risk management. The PRM server 211 may interact with and/or gather data from an operator of a system access device 220-224 226 227 or other source, such as from the RMC server 210. Data received may be structured according to risk criteria and utilized to calculate a risk quotient 108.

Typically an in-house user 222-224 or other user will access the PRM server 211 using client software executed at a system access device 212-214. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the PRM server 211 to the client computer and executed at the system access device or computer as part of the PRM software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Methods

Figure 3:
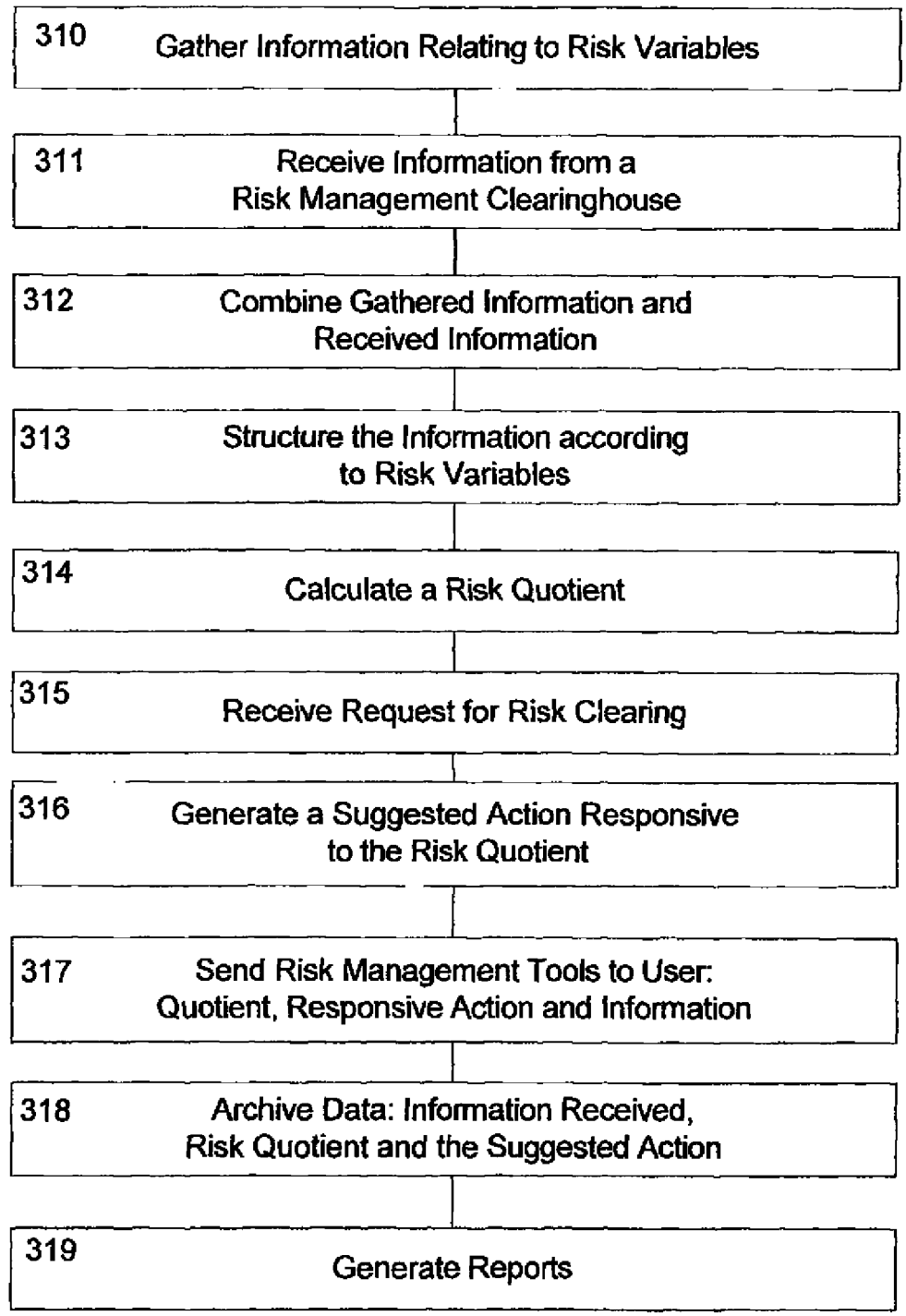
FIG. 3 illustrates a flow of exemplary steps that can be executed by a PRM system.

Referring now to FIG. 3, steps are illustrated which may be taken to implement various embodiments of the present invention and manage risk associated with a Financial Transaction. At 310, the steps can include gathering information relating to risk entities and other risk variables and receiving the gathered information into a PRM server 211. Informational data can be gathered from a user such as a Financial Institution employee, from a source of electronic data such as an external database, messaging system, news feed, government agency, from any other automated data provider, from a party to a transaction, or other source. Typically, the PRM server 211 will receive data relating to a transactor, beneficiary or other associated party. The informational data can also include data descriptive of informational artifacts with content related to one or more types of Risk, such as for example: Reputational Risk, Regulatory Risk and Legal Risk. In some embodiments, the informational data can be received on an ongoing basis such that if new events occur in the world that affect the exposure of a transactor, the calculated risk can be adjusted accordingly.

At 311, informational data can also be received from a RMC system 106 or other provider of risk management related data. In some embodiments, information received from a RMC system 106 can be structured according to risk variables and readily imported into a risk management database included as part of a PRM system 112. Data received from a RMC system 106 can include a periodic data dump, such as a download of any data fields that are new or modified since a previous data download. A data download can be executed, for example, on an hourly, daily, or monthly basis or other periodic schedule.

In addition to the types and sources of information listed previously that can provide indications of high risk, the Financial Institution or compliance entity can receive information that relates to requests to involve a Financial Institution that is not accustomed to foreign account activity; requests for secrecy or exceptions to Bank Secrecy Act requirements, routing through a secrecy jurisdiction, or missing wire transfer information; unusual and unexplained fund or transaction activity, such as fund flow through several jurisdictions or Financial Institutions, use of a government-owned bank, excessive funds or wire transfers, rapid increase or decrease of funds or asset value not attributable to the market value of investments, high value deposits or withdrawals, wires of the same amount of funds into and out of the account, and frequent zeroing of account balance; and large currency or bearer transactions, or structuring of transactions below reporting thresholds. Other information can include activities a person or entity is involved in, associates of a transactor, governmental changes, attempting to open more than one account in the same time proximity, or other related events.

Sources of information that supply informational data to a PRM server 211 or to a RMC server 210 can include, for example, publications issued by Treasury's Financial Crimes Enforcement Network ("FinCEN"), the State Department, the CIA, the General Accounting Office, Congress, the Financial Action Task Force ("FATF"), various international Financial Institutions (such as the World Bank and the International Monetary Fund), the United Nations, other government and non-government organizations, internet websites, news feeds, commercial databases, or other information sources.

A RMC server 210 can also be accessed in real time, or on a transaction by transaction basis. In the real time embodiment, any changes to data in the RMC may be automatically forwarded to an in-house PRM system 112. On a transaction by transaction basis, the RMC server 210 can be queried for specific data that relates to variables associated with a particular transaction.

At 312, all data received can be combined in the PRM server 112 to create an aggregate source of data which can be accessed to perform risk management activities. The step of combining data can be useful for aggregating public information received from a RMC system 106 type information provider with proprietary information contained in the PRM system 112. Combining data can be accomplished by any known data manipulation method. For example, the data can be maintained in separate tables and linked with relational linkages, or the data can be gathered into on comprehensive table or other data structure.

At 313, the information received as data can be structured according to defined risk variables. Risk variables are used to calculate an indicator of risk, such as a risk quotient score 108. For example, information received can be associated with one or more variables including a position held by the account holder or other transactor, the country in which the position is held, how long the position has been held, the strength of the position, the veracity of previous dealings with persons from that country, the propensity of people in similar positions to execute unlawful or unethical transactions, the type of transaction or other criteria.

At 314, a risk quotient score 108 can be calculated as a result of the analysis of the variables. For example, one method for calculating risk quotient 108 can include generating a numerical value or other scaled weighting that is resultant to particular information being associated with a variable. The scaled weighting is representative of a degree of risk experienced as a result of that particular information being associated with that variable. In addition the scaled weighting can be adjusted higher or lower, or otherwise re-weighted, depending upon information received that relates to another risk variable if the risk variables can have an affect upon each other. In this manner complex associations and can be developed between variables, and algorithms can be developed that reflect those associations.

For example, in one embodiment, a Risk quotient 108 can be calculated by weighting information received according to its importance in determining high Risk activities, such as the likelihood of illegal or unethical dealings. Calculating a risk quotient 108 can be accomplished by assigning a numerical value to each field of information, wherein the numerical value is representative of the Risk associated with that particular piece of information. Therefore, it may be determined in one case that a government official from a G-7 country trading equities in a public company from a G-7 country poses minimal Risk. This information from the first case is assigned a low numerical value, or even a negative numerical value. In a second case, an individual who appears on a list generated by the FATF and is attempting to transact in a corporate holding company may be viewed as a high risk. In another case, information conveying this high risk may be assigned a high numerical value. In addition, a weight can be assigned to a variable to which the information is assigned. Therefore a designated country may receive a higher weight than the position held, or vice versa. A Risk Quotient 108 can be calculated by multiplying a weighted numerical value of the specific information times the category weighting.

Similarly, information received may indicate that a transactor is a high ranking finance official from a G7 country. Other information may relate to an ownership variable which indicates that the ownership structure of a company the transactor wishes to transact is a public entity. A public entity may receive a numerical value of −5 because it is a relatively low risk ownership structure. In addition, this information may be included in a Company Profile variable, wherein the Company Profile is assigned a variable weighting of 3, in this case, a variable weighting cannot be a negative value. Therefore, the net score for this ownership structure can be calculated to be −5 times 3 or −15. Similarly the transactor or associated account holder being a high ranking official from a G-7 country may also receive a low number such as 1. The risk quotient for the transactor would be 1 times 3, or 3. All scores within the Company Profile can be summed to calculate a RMC risk quotient. In this case the RMC risk quotient is −15+3 which equals −12, indicating a low risk. Weighted risk scores from all associated categories can be summed to calculate a total Risk Quotient Score 108.

At 315, a request for clearing risk can be received by the PRM system 112 as part of a normal course of business, such as before consummating a Financial Transaction, or upon request. Risk clearing that is part of a normal course of business, may simply look for a risk quotient 108 or other risk rating to be below a threshold. Depending upon a level of risk calculated as well as the reasons for the risk calculation, at 316, a responsive action 114 can be generated that is commensurate with the level of risk and the underlying reasons.

As an example, in response to a high risk score, a responsive action 114 may recommend that a Financial Institution not proceed with a transaction, or that an appropriate authority be notified. In response to a low risk score, the Financial Institution may respond by completing a transaction as usual. Intermediate scores may respond by suggesting that additional information be gathered, that transactions for this account be monitored or other interim measures.

Once generated, risk management tools, such as the risk quotient 108, responsive action 114, and transaction related information, can be transmitted to an appropriate user. Typically, the risk management tools will be transmitted from the PRM server 211 to a PRM system access device 213-214, however, a Subscriber 220-221, or other user 226-227 that is remote to the PRM server may also submit risk management requests and receive risk management tools via a distributed network 201 or via voice, facsimile or other communication.

At 318, the PRM server 211 can also store in memory, or otherwise archive, Risk management related data and proceedings. For example, the PRM server 211 can store information received, a risk quotient generated 108, and/or any responsive action 114 taken. Archived management related data and proceedings can be useful to quantify corporate governance and diligent efforts to address high risk situations. Accordingly, at 319, reports quantifying PRM risk management procedures, executed due diligence, corporate governance, a s well as informational data and informational artifacts considered, or other matters can be generated.

Figure 4:
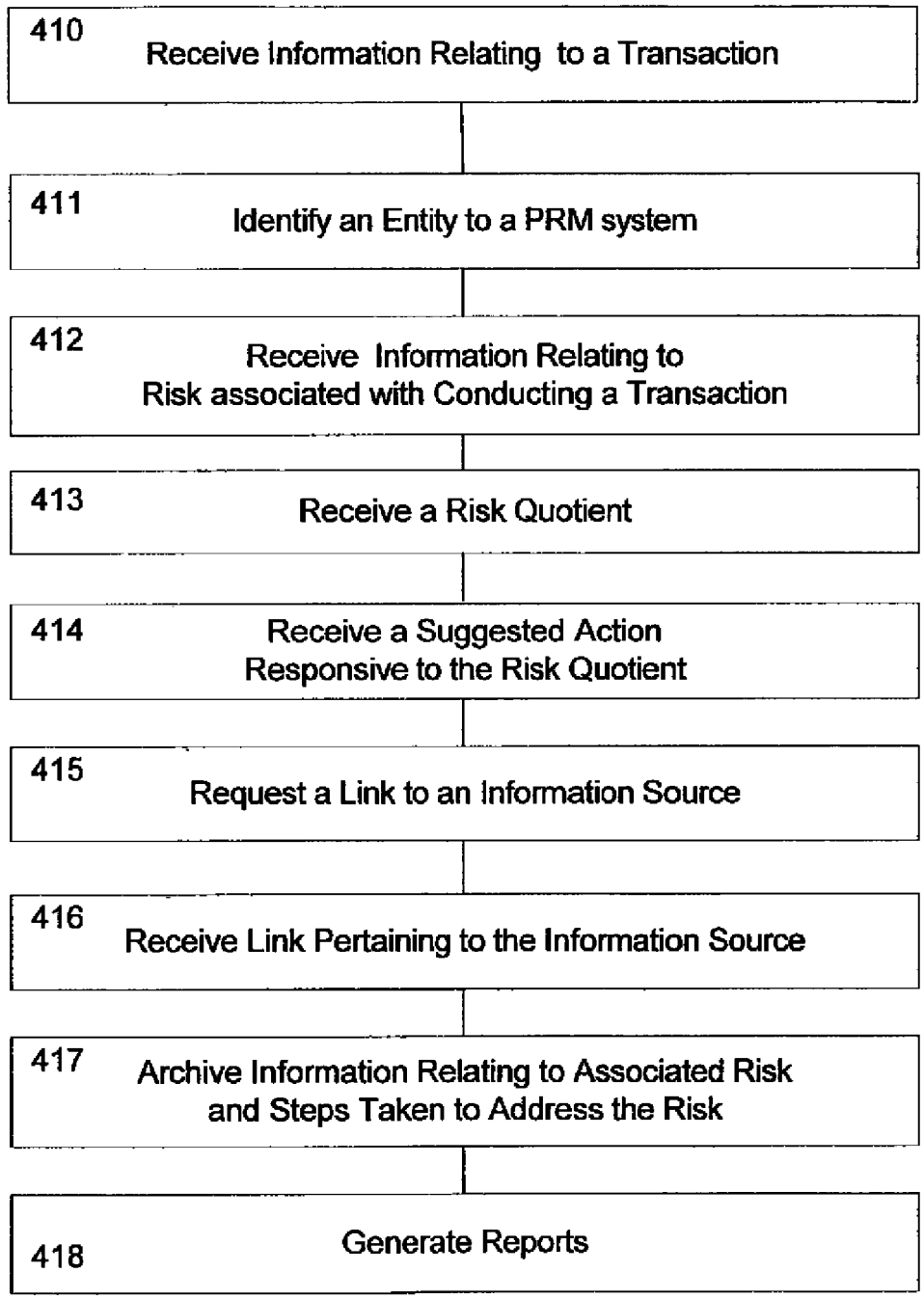
FIG. 4 illustrates a flow of exemplary steps that can taken by a user of the PRM system.

Referring now to FIG. 4, a flow chart illustrates additional steps that can be implemented to manage risk associated with a transaction. At 410, a Subscriber can receive information relating to one or more risk variables such as, for example, an Transaction Participant associated with a Financial Transaction. This information may be received during the normal course of business, such as when a Transaction Participants are ascertained. At 411, the Subscriber can access a PRM server 211 and identify to the PRM server 211 one or more entities, jurisdictions, or other Risk Variables involved in the transaction. Access can be accomplished by opening a dialogue with a PRM system 211 with a network access device, 204-207, 212-214. Typically, the dialogue would be opened by presenting a GUI to a network access device accessible by a person or an electronic feed that will enter information relating to the transactor. The GUI will be capable of accepting data input via a network access device. An example of a GUI would include a series of questions relating to a transaction. Alternatively, information can be received directly into fields of a database, such as from a commercial data source. Questions can be fielded during a transaction, or at any other opportunity to gather information.

In one embodiment, automated monitoring software can run in the background of a normal transaction program and screen data traversing an application. The screened data can be processed to determine key words wherein the key words can in turn be presented to the PRM server 211 as risk variables. The PRM server 211 will process the key words to identify entities or other risk variables. Monitoring software can also be installed to screen data traversing a network or communications link.

At 412, the Subscriber can receive back information relating to one or more Risks associated with conducting a transaction involving the submitted Risk Variables. In one embodiment, a Subscriber can receive ongoing monitoring of key words, identified entities, a geographic location, or other subject, or list of subjects. Any updated information or change of status detected via an ongoing monitoring can result in an alarm or other alert being sent to one or more appropriate users.

At 413, the user can also receive a risk quotient. As addressed more completely above, the risk quotient is typically a scaled numerical score based upon values for weighted criteria. It will represent a magnitude of risk associated with a particular transaction and can be based upon the participants involved in a transaction, the type of transaction, the state sovereignties involved, an amount of money involved in the transaction, or other risk variables.

At 414, in addition to receiving a risk quotient, a user can also receive one or more responsive actions from a PRM server 211. A suggested action based upon informational data and informational artifacts can include steps that can be taken by the Financial Institution or other user to address a risk that is associated with the transaction. At 415, if appropriate, a user can request identification of a source of informational data or an informational artifact and at 416, receive identification of a source of informational data or informational artifact. The source of the may be useful to pursue more details relating to the informational data and/or informational artifact, or may just be utilized to help determine the credibility of the information received.

At 417, a user can also cause an archive to be created relating to Risk management. An archive may include, for example, information received relating to Risk associated with a Financial Transaction, as well as steps taken to address the Risk, and a Risk Quotient. In addition, at 418, the user can cause a PRM server 211 to generate reports that can include, for example, a description of related informational data and informational artifacts and otherwise document actions taken to address due diligence relating to Risk management.

Figure 5:
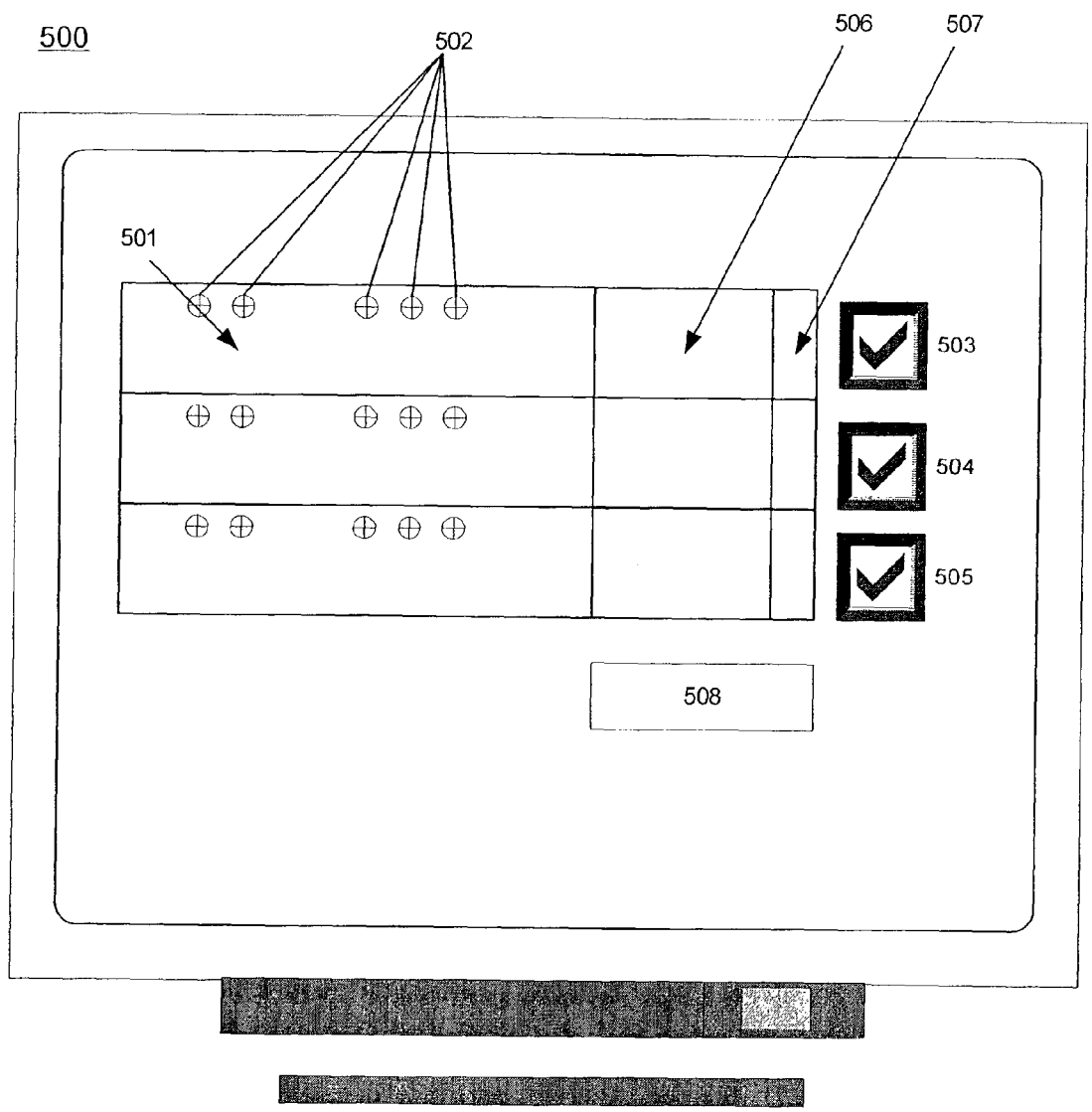
FIG. 5 illustrates an exemplary graphical user interface useful for gathering information according to the present invention.

Referring now to FIG. 5, an exemplary GUI for displaying information related to PRM is illustrated 500. The GUI can include areas prompting for information, such as in the form of a key word or a question 501. Areas can also be included for an appropriate response 506. The area for an appropriate response 506 can, for example, receive text, allow a selection from choices proffered, or otherwise receive data into the PRM server 211. A programmable user interactive device, such as a checkbox, X field, yes/no filed or other device 503-505 can also be utilized to indicate an answer, or otherwise input information. Other programmable devices, such as programmable icons, hyperlinks, push buttons or other devices 502 can be utilized to execute a particular function. A category weighting area 507 can also be included on the GUI 500. Typically the weighting will be predetermined. However, if desired the weighting can be modified by a user such that a weighting value, such as a numerical value, will be utilized to calculate a risk quotient. The PRM GUI 500 can also include an area for displaying a quotient score relating to the transaction 508.

Figure 6:
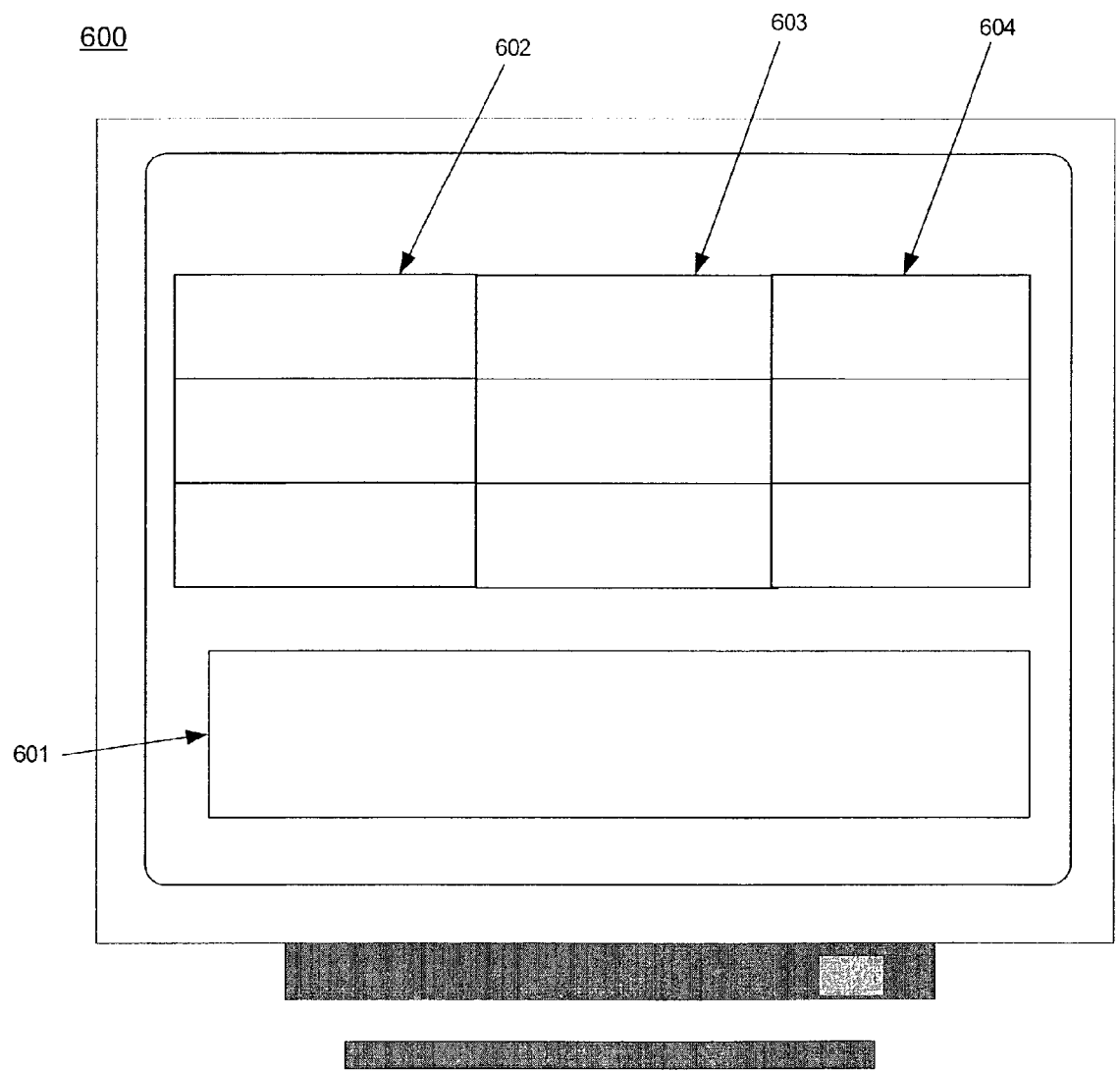
FIG. 6 illustrates an exemplary graphical user interface useful for presenting reports related to proprietary risk management.

Referring now to FIG. 6, an exemplary GUI for presenting reports or suggested actions related to PRM is illustrated 600. The GUI for presenting reports 600 can include geographic areas of a user interface containing risk management procedures 601, including those procedures specifically followed in relation to a particular PRM query or other suggested actions. Additional areas can include a list of electronic or hardcopy reports available concerning risk management efforts undertaken 602. Another area can include a list of risk quotients and./or calculations concerning a risk quotient, such as the average risk quotient for the financial institution, or the mean risk quotient 603. Still another area can contain information descriptive of a particular transactor or other PRM risk subject 604.

A number of embodiments of the present invention have been described. Nevertheless, it will be understood that various modifications may be made without departing from the spirit and scope of the invention. For example, network access devices 204-208 can comprise a personal computer executing an operating system such as Microsoft Windows™, Unix™, or Apple Mac OSTM, as well as software applications, such as a JAVA program or a web browser. network access devices 204-208 can also be a terminal device, a palm-type computer, mobile WEB access device, a TV WEB browser or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

The invention claimed is:

1. A computer system implemented method for managing regulatory and reputational risk, the method comprising:

receiving into a computer system informational artifacts with content related to at least one of: reputational risk, regulatory risk and legal risk transaction including requests involving unaccustomed foreign account activity, requests for secrecy or exceptions to Bank Secrecy Act requirements, requests for routing through a secrecy jurisdiction and unusual fund or transaction activity;

defining within the computer system one or more risk variables generally related to one or more financial transactions;

receiving into the computer system proprietary data descriptive of a particular financial;

identifying by the computer system one or more risk variables with the received proprietary data;

assigning at least one category numerical value to the received proprietary data, wherein the category numerical value is a weight assigned according to a category of the received proprietary data;

associating by the computer system at least one informational artifact with content related to at least one of: reputational risk, regulatory risk and legal risk, with the risk variables identified;

generating a numerical weighted value, wherein the numerical weighted value is a rating of risk experienced by the risk variable associated with at least one informational artifact with content related to at least one of: reputational risk, regulatory risk and legal risk;

calculating a risk quotient by multiplying the generated numerical weighting value with the category numerical value;

updating by the computer system the association of the content based on receiving periodic supplemental data associated with reputational risk, regulatory risk and legal risk informational artifacts;

detecting potential violations of law and addressing suitability of the particular financial transaction by creating structured historical data relating to the particular financial transaction based on the calculated risk quotient; and generating by the computer system a report based on the structured historical data for use within a predefined organization and comprising a description of the informational artifacts associated with the risk variables identified.

2. The method of claim 1 additionally comprising:
wherein the calculated risk quotient is indicative of a quantitative amount of at least one of: reputational risk, regulatory risk and legal risk, associated with the financial transaction, wherein the risk quotient is based upon the at least one informational artifact associated with the risk variables.

3. The method of claim 2 additionally comprising the step of calculating an average risk quotient for multiple financial transactions associated with a financial institution.

4. The method of claim 1, wherein the data descriptive of informational artifacts with content related to at least one of: reputational risk, regulatory risk and legal risk is received from a risk management clearinghouse data provider.

5. The method of claim 1 additionally comprising the step of generating a suggested action based upon to informational artifacts associated with the risk variables identified.

6. The method of claim 5 wherein the suggested action is directed towards reducing risk related to a financial transaction with international exposure.

7. The method of claim 5 additionally comprising recalculating the risk quotient based upon implementation of the suggested action.

8. The method of claim 5 wherein the suggested action comprises refusing to perform a transaction.

9. The method of claim 5 wherein the suggested action comprises blocking the opening of an account.

10. The method of claim 5 wherein the suggested action comprises notifying a law enforcement authority.

11. The method of claim 1 wherein the data descriptive of a financial transaction comprises the identity of a secrecy jurisdiction associated with the risk subject.

12. A computer system implemented method of conducting a financial transaction, the method comprising:

transmitting the details descriptive of a particular transaction to a computer system via a communications network, wherein the computer server is operative with executable software to:

receive into the computer system the details descriptive of the particular financial transaction;

receive into the computer system data descriptive of informational artifacts with content related to at least one of:
reputational risk, regulatory risk and legal risk including requests involving unaccustomed foreign account activity, requests for secrecy or exceptions to Bank Secrecy Act requirements, requests for routing through a secrecy jurisdiction and unusual fund or transaction activity;

identify by the computer system one or more risk variables with the received proprietary data;

assigning at least one category numerical value to the received proprietary data, wherein the category numerical value is a weight assigned according to a category of the received proprietary data;

associate by the computer system at least one informational artifact with content related to at least one of:
reputational risk, regulatory risk and legal risk, with the risk variables identified;

transmit by the computer system data descriptive of the content of the at least one informational artifact associated with the risk variables identified;

receiving by the computer system the data descriptive of the content of the at least one informational artifact associated with the risk variables identified;

generating a numerical weighted value, wherein the numerical weighted value is a rating of risk experienced by the risk variable associated with at least one informational artifact with content related to at least one of: reputational risk, regulatory risk and legal risk;

calculating a risk quotient by multiplying the generated numerical weighting value with the category numerical value;

updating by the computer system the data descriptive of the content based on receiving periodic supplemental data associated with reputational risk, regulatory risk and legal risk informational artifacts;

detecting potential violations of law and addressing suitability of the particular financial transaction by creating structured historical data relating to the particular financial transaction based on the calculated risk quotient; and determining by the computer system a course of action related to the financial transaction based upon the data descriptive of the content of the at least one informational artifact associated with the risk variables identified and the structured historical data.

13. The method of claim 12 wherein the course of action comprises proceeding with the financial transaction.

14. The method of claim 12 wherein the course of action comprises refusing to proceed with the financial transaction.

15. The method of claim 12 wherein the course of action comprises the additional steps of:

receiving additional information descriptive of at least one of:

a transaction participant, a beneficiary of a transaction, a jurisdiction involved with the transaction, and a person with a legal relation to a transaction participant.

16. A non-transitory computer-readable medium comprising computer-executable instructions for causing a computer system to:

receive into the computer system the proprietary details descriptive of the particular financial transaction;

receive into the computer system data descriptive of informational artifacts with content related to at least one of: reputational risk, regulatory risk, and legal risk including requests involving unaccustomed foreign account activity, requests for secrecy or exceptions to Bank Secrecy Act requirements, requests for routing through a secrecy jurisdiction and unusual fund or transaction activity;

identify by the computer system one or more risk variables with the received proprietary data;

assign at least one category numerical value to the received proprietary data, wherein the category numerical value is a weight assigned according to a category of the received proprietary data;

associate by the computer system at least one informational artifact with content related to at least one of: reputational risk, regulatory risk and legal risk, with the risk variables identified;

generate a numerical weighted value, wherein the numerical weighted value is a rating of risk experienced by the risk variable associated with at least one informational artifact with content related to at least one of: reputational risk, regulatory risk and legal risk;

calculate a risk quotient by multiplying the generated numerical weighting value with the category numerical value;

update the association of the content based on receiving periodic supplemental data associated with reputational risk, regulatory risk and legal risk informational artifacts;

detect potential violations of law and addressing suitability of the particular financial transaction by creating structured historical data relating to the particular financial transaction based on the calculated risk quotient; and transmit, via the computer system, data descriptive of the content of the at least one informational artifact associated with the risk variables identified and the structured historical data.

* * * * *